US012561603B2

(12) United States Patent  (10) Patent No.:  US 12,561,603 B2

Murray  (45) Date of Patent:  Feb. 24, 2026

(54) SYSTEM FOR TIME BASED MONITORING AND IMPROVED INTEGRITY OF MACHINE LEARNING MODEL INPUT DATA

(71) Applicant: BANK OF AMERICA CORPORATION, Charlotte, NC (US)

(72) Inventor: Matthew Bruce Murray, Roanoke, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 999 days.

(21) Appl. No.: 17/366,773

(22) Filed: Jul. 2, 2021

(65) Prior Publication Data

US 2023/0004861 A1  Jan. 5, 2023

(51) Int. Cl.
| | |
|---|---|
| *G06N 20/00* | (2019.01) |
| *G06F 16/245* | (2019.01) |
| *G06F 16/248* | (2019.01) |
| *G06N 5/04* | (2023.01) |

(52) U.S. Cl.
CPC ........... *G06N 20/00* (2019.01); *G06F 16/245* (2019.01); *G06F 16/248* (2019.01); *G06N 5/04* (2013.01)

(58) Field of Classification Search
CPC .......... G06N 20/00; G06N 5/04; G06N 3/044; G06N 5/047; G06F 16/245; G06F 16/248; G06F 16/24566; G06F 16/38; G06F 16/48; G06F 16/383; G06F 16/387; G06F 16/40; G06F 16/43
See application file for complete search history.

(56) References Cited

U.S. PATENT DOCUMENTS

| | | | |
|---|---|---|---|
| 7,958,113 B2 | 6/2011 | Fan et al. | |
| 8,762,298 B1 | 6/2014 | Ranjan et al. | |
| 9,015,093 B1 | 4/2015 | Commons | |
| 9,092,802 B1 | 7/2015 | Akella | |
| 9,292,262 B2 | 3/2016 | Gabel et al. | |
| 9,697,469 B2 | 7/2017 | Mcmahon et al. | |
| 9,754,081 B2 | 9/2017 | Ghasemzadeh et al. | |
| 9,833,196 B2 | 12/2017 | Sarrafzadeh et al. | |
| 9,836,455 B2 | 12/2017 | Martens et al. | |
| 10,503,967 B2 | 12/2019 | Sarrafzadeh et al. | |
| 10,534,257 B2 | 1/2020 | Tetiker et al. | |
| 10,585,347 B2 | 3/2020 | Sriraman et al. | |
| 10,586,280 B2 | 3/2020 | Mckenna et al. | |
| 10,722,180 B2 | 7/2020 | Zhang et al. | |
| 11,609,838 B2 * | 3/2023 | Nyati ..................... | G06F 11/323 |
| 2005/0033709 A1 * | 2/2005 | Meng ....................... | G06N 3/08 |
| | | | 706/16 |

(Continued)

*Primary Examiner* — Michael J Huntley
*Assistant Examiner* — Jasmine Thanh Thai
(74) *Attorney, Agent, or Firm* — Moore & Van Allen PLLC; Nicholas C. Russell

(57)  ABSTRACT

Embodiments of the invention are directed to systems, methods, and computer program products for providing intelligent system and methods for identifying and weighting volatile data in machine learning data sets. The system is adaptive, in that it can be adjusted based on the needs or goals of the user utilizing it, or may intelligently and proactively adapt based on the data set or machine learning model being employed. The system may be seamlessly embedded within existing applications or programs that the user may already use to interact with one or more entities, particularly those which aid in the managing of user resources.

14 Claims, 4 Drawing Sheets

(56)          References Cited

U.S. PATENT DOCUMENTS

| | | | | |
|---|---|---|---|---|
| 2008/0208814 A1* | 8/2008 | Friedlander | ......... | G06F 16/2458 |
| 2015/0317589 A1 | 11/2015 | Anderson et al. | | |
| 2015/0379061 A1 | 12/2015 | Paraschivescu | | |
| 2017/0372232 A1* | 12/2017 | Maughan | .............. | G06F 3/0482 |
| 2018/0068083 A1 | 3/2018 | Cohen et al. | | |
| 2019/0121350 A1 | 4/2019 | Cella et al. | | |
| 2019/0207960 A1 | 7/2019 | Chu et al. | | |
| 2019/0258878 A1 | 8/2019 | Koivisto et al. | | |
| 2020/0019893 A1* | 1/2020 | Lu | .......................... | G06N 5/025 |
| 2020/0042703 A1* | 2/2020 | Herman Saffar | ..... | G06F 21/554 |
| 2020/0090056 A1* | 3/2020 | Singhal | .................... | G06N 5/04 |
| 2020/0374305 A1* | 11/2020 | Kursun | ................. | G06N 5/047 |
| 2021/0035021 A1* | 2/2021 | Sasson | ................... | G06N 20/00 |
| 2021/0042581 A1* | 2/2021 | Kursun | ................. | G06F 21/552 |
| 2021/0049302 A1* | 2/2021 | Kursun | .............. | G06F 11/3006 |
| 2021/0049456 A1* | 2/2021 | Kursun | ................. | G06N 3/047 |
| 2022/0405619 A1* | 12/2022 | Ramamurthy | ...... | G06F 16/9024 |

* cited by examiner

USER DEVICE 104

COMMUNICATION DEVICE
360

PROCESSING DEVICE
310

POSITIONING SYSTEM DEVICE
320

USER INPUT DEVICES (E.G. MICROPHONE, KEYPAD, TOUCHPAD, AND THE LIKE)
330

USER OUTPUT DEVICES (E.G. DISPLAY, SPEAKER, AND THE LIKE)
340

MEMORY 350

USER APPLICATION
351

ENTITY APPLICATION
352

SYSTEM FOR TIME BASED MONITORING AND IMPROVED INTEGRITY OF MACHINE LEARNING MODEL INPUT DATA

BACKGROUND

With the usage of machine learning and artificial intelligence becoming more prevalent, the there is a need for systems and methods to analyze how data sets used to train various models may be affected by volatility in continuously updated data streams. Identifying and accounting for volatility in changing data sets can lead to more accurate machine learning modeling techniques.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The systems and methods described herein address the above needs by providing intelligent system and methods for identifying and weighting volatile data in machine learning data sets. The system is adaptive, in that it can be adjusted based on the needs or goals of the user utilizing it, or may intelligently and proactively adapt based on the data set or machine learning model being employed. The system may be seamlessly embedded within existing applications or programs that the user may already use to interact with one or more entities, particularly those which aid in the managing of user resources. For instance, the system may be adjusted to analyze transactions, deposits, withdrawals, or the like, in order to identify trends and patterns. The system may utilize this information in order to intelligently generate system output and create a more efficient project flow.

The invention utilizes a process for machine learning volatility detection by continuously analyzing model output data to identify shifts. By analyzing and identifying how changing data over time affects the output of machine learning models, the system is able to project and account for data fluctuations in the future, essentially anticipating and proactively adapting for variable data input to improve the integrity and accuracy of machine learning models. This system identifies volatile data, and may apply one or more weighting factors to the data input to one or more machine learning models in order to discern effects on model output. The system begins with identification of volatility within a model. The system then assigns weighting to features and data. The system then compares the resultant output and discerns how often the output changes during a particular event or over a period of time. The system then assigns a weighted value to one or more data features as a predictor of future events. Once the system has identified volatility within a model, the system may employ a dampening application that makes volatile input data less significant as time goes on. In some embodiments, the system applies less weight to older data. As such, there are two key aspects to this invention: a machine learning volatility measuring component, and a dampening application to apply to the data within one or more models.

Embodiments of the invention relate to systems, methods, and computer program products for dynamic feedback on resource usage, the system generally comprising the following steps: receive one or more data sets for machine learning model analysis; parse the one or more data sets and identify one or more features based on meta data of the one or more data sets; transmit the one or more data sets to a machine learning model; continuously monitor machine learning model analysis output; identify a shift in the machine learning model analysis output; correlate features of the one or more data sets with the identified shift in the machine learning model analysis output to identify one or more volatile features in the one or more data sets; and apply a weighting to the one or more volatile features in the one or more data sets to offset the shift in the machine learning model analysis output.

In some embodiments, the one or more data sets comprises a continuous stream of data.

In some embodiments, the one or more data sets comprises resource transaction information and meta data.

In other embodiments, the machine learning model further comprises a predictive machine learning model or pattern recognition machine learning model.

In further embodiments, the weighting further comprises a dampening variable lessening effect of the one or more volatile features on the machine learning model analysis output.

In some embodiments, the weighting is applied dynamically to lessen effect of older data on the machine learning model analysis output over time.

In still further embodiments, the invention is further configured to generate a prediction based on the one or more volatile features, wherein the prediction comprises an expected effect of the one or more volatile features on future machine learning model analysis output.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
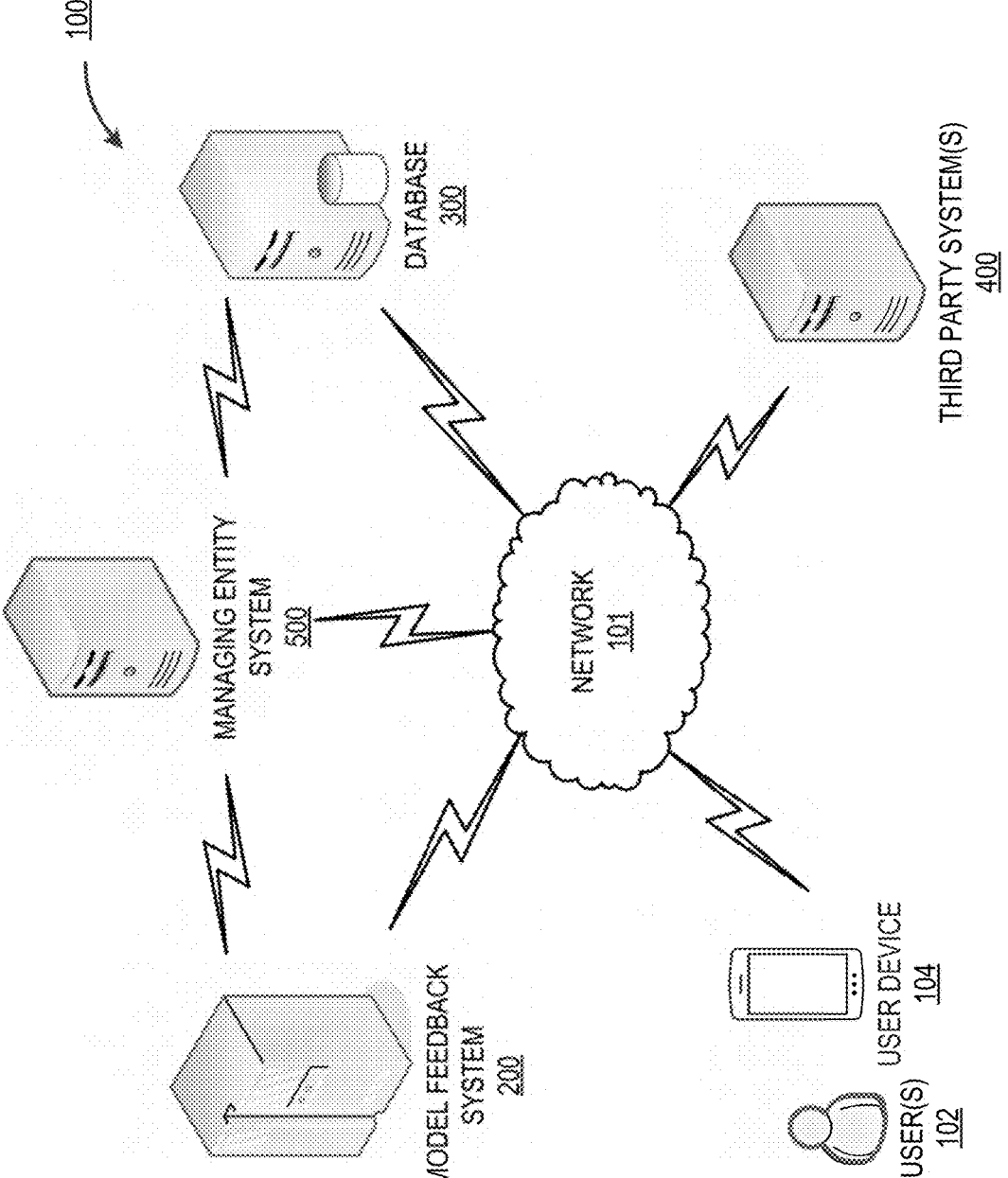
Figure 2:
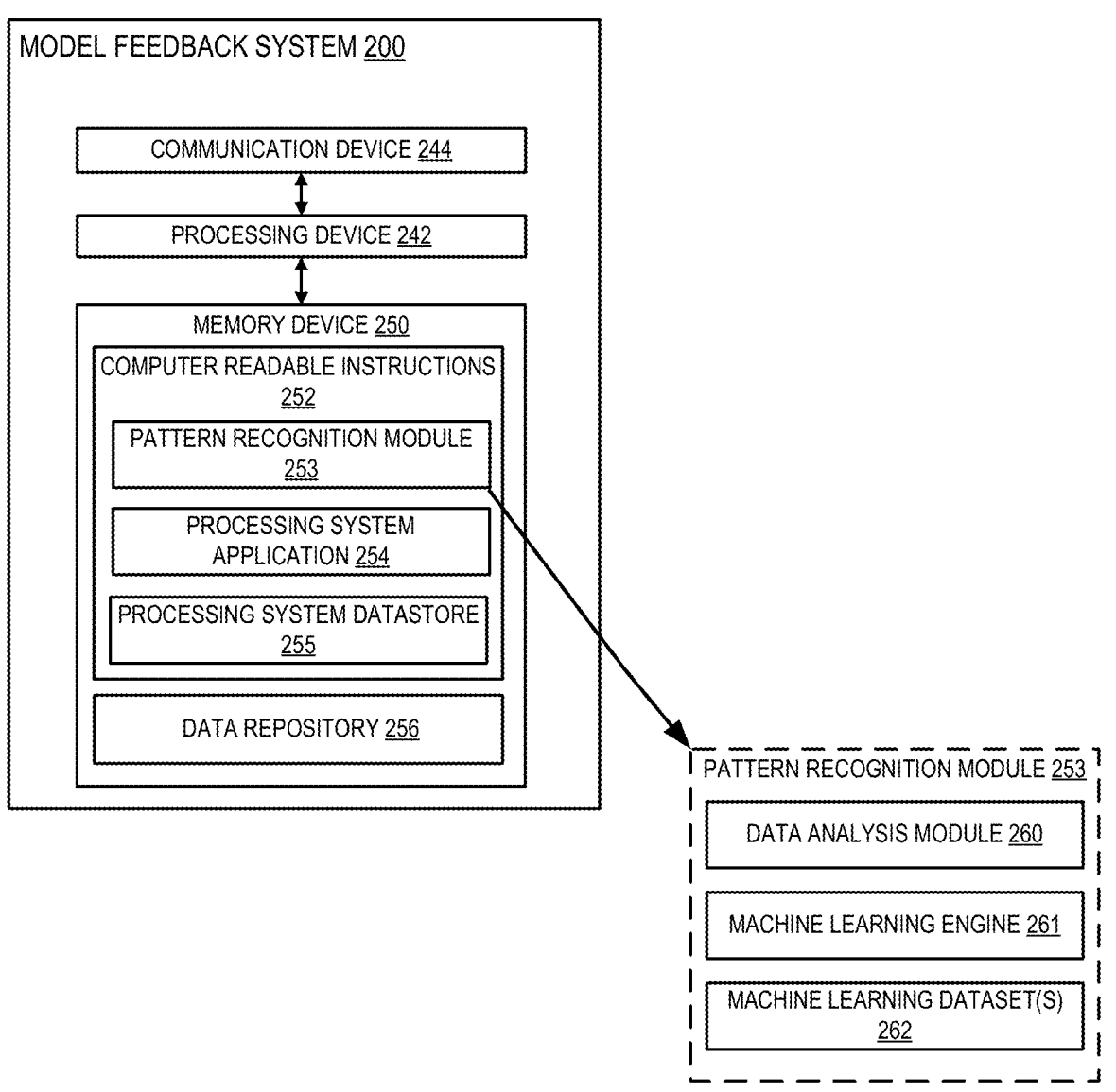
Figure 3:
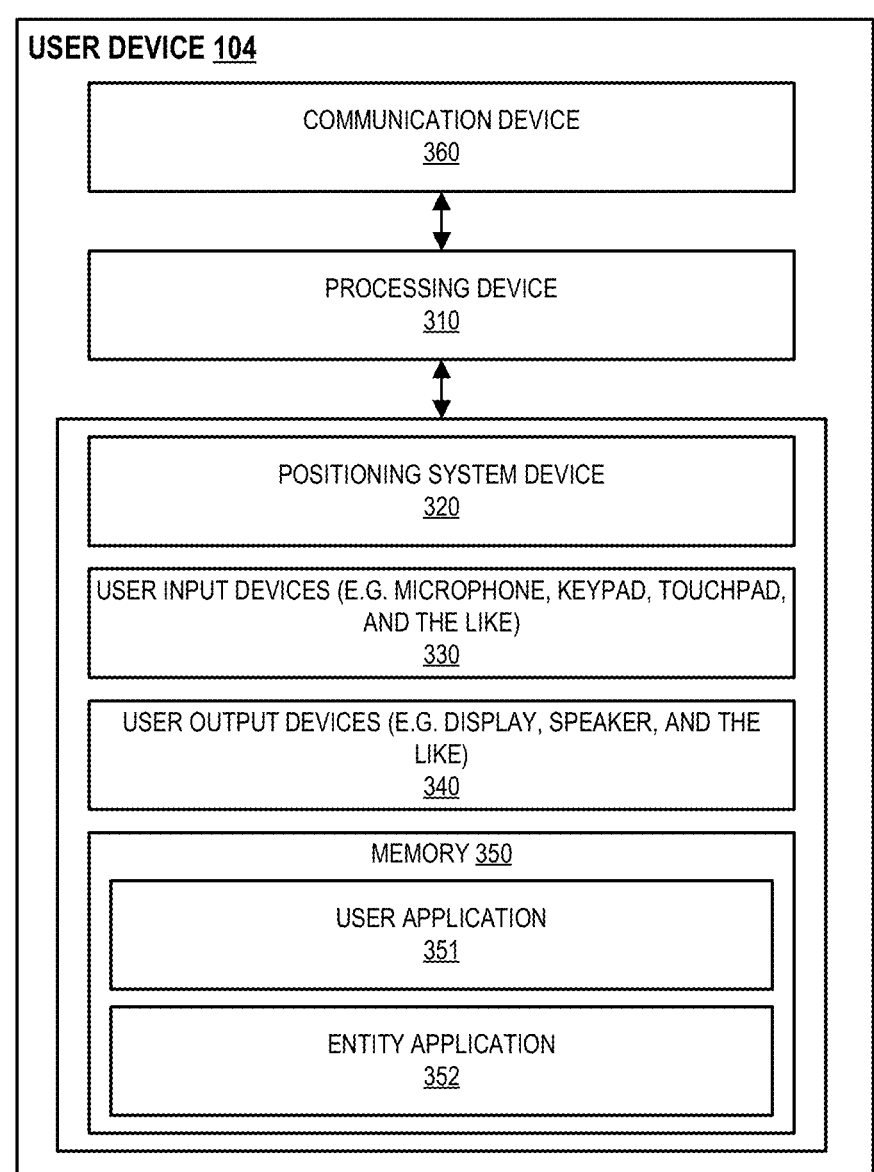
Figure 4:
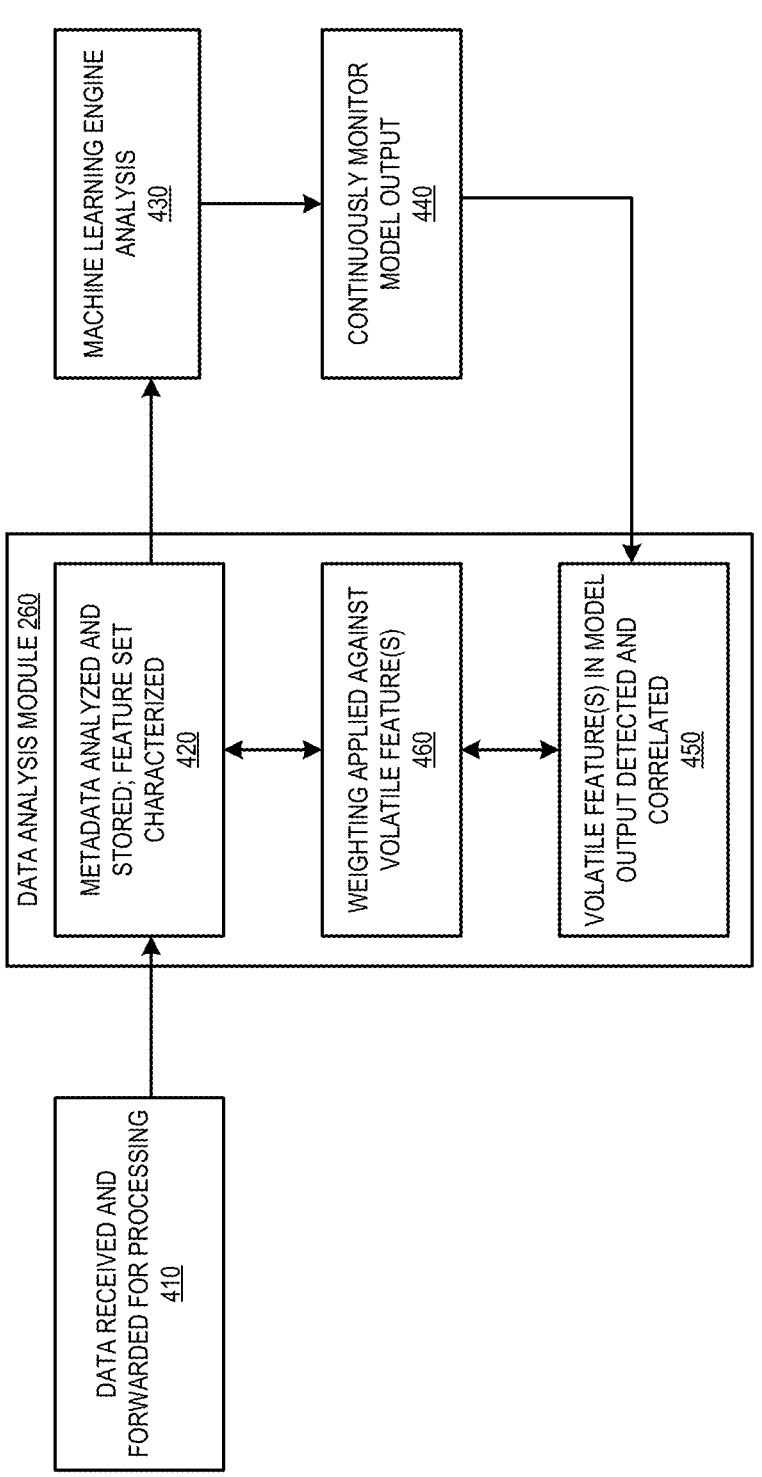

Having thus described embodiments of the invention in general terms, reference will now be made to the accompanying drawings, wherein:

FIG. 1 illustrates an operating environment for the model feedback system, in accordance with one embodiment of the present disclosure;

FIG. 2 is a block diagram illustrating components of the model feedback system, in accordance with one embodiment of the present disclosure;

FIG. 3 is a block diagram illustrating a user device associated with the model feedback system, in accordance with one embodiment of the present disclosure; and FIG. 4 is a flow diagram illustrating a model feedback loop, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be the merchant itself.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"User" as used herein may refer to an individual associated with an entity. As such, in some embodiments, the user may be an individual having past relationships, current relationships or potential future relationships with an entity. In some instances, a "user" is an individual who has a relationship with the entity, such as a customer or a prospective customer. Accordingly, as used herein the term "user device" or "mobile device" may refer to mobile phones, personal computing devices, tablet computers, wearable devices, and/or any portable electronic device capable of receiving and/or storing data therein and are owned, operated, or managed by a user.

"Transaction" or "resource transfer" as used herein may refer to any communication between a user and a third party merchant or individual to transfer funds for purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following:

renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

The system allows for use of a machine learning engine to intelligently identify patterns in received resource transaction data. The machine learning engine may be used to analyze historical data in comparison to real-time received transaction data in order to identify transaction patterns or potential issues. The machine learning engine may also be used to generate intelligent aggregation of similar data based on metadata comparison resource transaction characteristics, which in some cases may be used to generate a database visualization of identified patterns similarities.

FIG. 1 illustrates an operating environment for decisioning resource usage based on real time feedback, in accordance with one embodiment of the present disclosure. As illustrated, the operating environment 100 may comprise a user 102 and/or a user device 104 in operative communication with one or more third party systems 400 (e.g., web site hosts, registry systems, financial entities, third party entity systems, or the like). The operative communication may occur via a network 101 as depicted, or the user 102 may be physically present at a location separate from the various systems described, utilizing the systems remotely. The operating environment also includes a managing entity system 500, model feedback system 200, a database 300, and/or other systems/devices not illustrated herein and connected via a network 101. As such, the user 102 may request information from or utilize the services of the model feedback system 200, or the third party system 400 by establishing operative communication channels between the user device 104, the managing entity system 500, and the third party system 400 via a network 101.

Typically, the model feedback system 200 and the database 300 are in operative communication with the managing entity system 500, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the third party system 400). In this regard, the wireless communication channel may further comprise near field communication (NFC), communication via radio waves, communication through the internet, communication via electromagnetic waves and the like.

The user device 104 may comprise a mobile communication device, such as a cellular telecommunications device (e.g., a smart phone or mobile phone, or the like), a computing device such as a laptop computer, a personal digital assistant (PDA), a mobile internet accessing device, or other mobile device including, but not limited to portable digital assistants (PDAs), pagers, mobile televisions, laptop computers, cameras, video recorders, audio/video player, radio, GPS devices, any combination of the aforementioned, or the like. The user device is described in greater detail with respect to FIG. 3.

The managing entity system 500 may comprise a communication module and memory not illustrated, and may be configured to establish operative communication channels with a third party system 400 and/or a user device 104 via a network 101. The managing entity may comprise a data repository 256. The data repository 256 may contain resource account data, and may also contain user data. This user data may be used by the managing entity to authorize or validate the identity of the user 102 for accessing the system (e.g., via a username, password, biometric security mechanism, two-factor authentication mechanism, or the like). In some embodiments, the managing entity system is in operative communication with the model feedback system 200 and database 300 via a private communication channel. The private communication channel may be via a network 101 or the model feedback system 200 and database 300 may be fully integrated within the managing entity system 500, such as a virtual private network (VPN), or over a secure socket layer (SSL).

The managing entity system 500 may communicate with the model feedback system 200 in order to transmit data associated with observed resource transaction or account data by or via a plurality of third party systems 400. In some embodiments, the managing entity system 500 may utilize the features and functions of the model feedback system 200 to initialize advisory measures in response to identifying user interests or needs. In other embodiments, the managing entity and/or the one or more third party systems 400 may utilize the intelligent information sharing system to react to identified trends, patterns, or potential issues.

FIG. 2 illustrates a block diagram of the model feedback system 200 associated with the operating environment 100, in accordance with embodiments of the present invention. As illustrated in FIG. 2, the model feedback system 200 may include a communication device 244, a processing device 242, and a memory device 250 having a pattern recognition module 253, a processing system application 254 and a processing system datastore 255 stored therein. As shown, the processing device 242 is operatively connected to and is configured to control and cause the communication device 244, and the memory device 250 to perform one or more functions. In some embodiments, the pattern recognition module 253 and/or the processing system application 254 comprises computer readable instructions that when executed by the processing device 242 cause the processing device 242 to perform one or more functions and/or transmit control instructions to the database 300, the managing entity system 500, or the communication device 244. It will be understood that the pattern recognition module 253 or the processing system application 254 may be executable to initiate, perform, complete, and/or facilitate one or more portions of any embodiments described and/or contemplated herein. The pattern recognition module 253 may comprise executable instructions associated with data processing and analysis and may be embodied within the processing system application 254 in some instances. The model feedback system 200 may be owned by, operated by and/or affiliated with the same managing entity that owns or operates the managing entity system 500. In some embodiments, the model feedback system 200 is fully integrated within the managing entity system 500.

The pattern recognition module 253 may further comprise a data analysis module 260, a machine learning engine 261, and a machine learning dataset(s) 262. The data analysis module 260 may store instructions and/or data that may cause or enable the model feedback system 200 to receive, store, and/or analyze data received by the managing entity system 500 or the database 300, as well as generate information and transmit responsive data to the managing entity system 500 in response to one or more requests or via a real-time data stream between the model feedback system 200 and the managing entity system 500. The data analysis module may pre-process data before it is fed to the machine learning engine 261. In this way, the model feedback system 200 may exercise control over relevance or weighting of certain data features, which in some embodiments may be determined based on a meta-data analysis of machine learning engine 261 output over time as time-dependent data is changed.

For instance, in some embodiments, the data analysis module may receive a number of data files containing metadata which identifies the files as originating from a specific source, being created at a specific time, day, or the like, and may package this data to be analyzed by the machine learning engine 261, as well as store the files in a catalog of data files in the data repository 256 or database 300 (e.g., files may be catalogued according to any metadata characteristic, including descriptive characteristics such as source, identity, time since creation, or the like, or including data characteristics such as file type, size, encryption type, or the like). The machine learning engine 261 and machine learning dataset(s) 262 may store instructions and/or data that cause or enable the model feedback system 200 to generate, in real-time and based on received information, new output in the form of prediction, current status, analysis, or the like of one or more transactions or transaction patterns. In some embodiments, the machine learning engine 261 and machine learning dataset(s) 262 may store instructions and/or data that cause or enable the model feedback system 200 to determine, in real-time and based on received information, recommended resource actions or prophylactic actions to be taken to benefit one or more specific users or systems.

The machine learning dataset(s) 262 may contain data queried from database 300 or may be extracted or received from third party systems 400, managing entity system 500, or the like, via network 101. The database 300 may also contain metadata, which may be generated at the time of data creation, onboarding to the managing entity system 500 or model feedback system 200, or in some cases may be generated specifically by the data analysis module 260. In some cases, the metadata may include statistics regarding each column of features in a dataset, which may be stored in a separate tabular dataset and tracked over a certain temporal period, such as a day, month, multi-month period, or the like, in order to provide the capability for meta-analysis on how data features affect modeling over time.

In some embodiments, the machine learning dataset(s) 262 may also contain data relating to user activity or device information, which may be stored in a user account managed by the managing entity system. In some embodiments, the machine learning engine 261 may be a single-layer recurrent neural network (RNN) which utilizes sequential models to achieve results in audio and textual domains. Additionally, the machine learning engine 261 may serve an alternate or dual purpose of analyzing user resource account history, user preferences, user interests, or other user submitted or gathered data from managing entity system 500, third party system 400, or the like, in order to generate or locate intelligent recommendations or discoveries within datasets. For instance, the machine learning engine may consist of a multilayer perceptron neural network, recurrent neural network, or a modular neural network designed to process input variables related to one or more user characteristics and output recommendations or predictions. Given the nature of the managing entity system 500, particularly in embodiments where the managing entity system 500 is a financial institution, the machine learning engine 261 may have a large dataset of user account information, resource transaction information, account resource amount information, or the like, from which to draw from and discern specific patterns or correlations related to resource spending, saving, or the like which may be beneficial or of interest to particular users. It is understood that such data may be anonymized or completely stripped of identifying characteristics in preferred embodiments with no negative impact the system's ability to generate accurate output or prediction data given certain variables. For instance, users with a resource deposit amount of X, and a resource outflow amount of Y, and whose transaction histories indicate an interest in product category Z, may be interested in a particular product, service, or the like offered by the managing entity system 500 (e.g., a user who has a certain amount of disposable resources who is known to have purchased home-improvement products in the preceding weeks or months may be interested in a specialized line of home equity credit, an additional specialized savings account, or the like).

These intelligently generated recommendations may be related to products or services offered by one or more entities, while in other embodiments may be generally directed to beneficial tips or advice on increasing resource savings, resource inflow, or the like (e.g., a user which has a newly established resource savings account may be interested in saving a certain percentage of resource inflow per month, as recognized and recommended by the machine learning engine 261). In this way, the system may analyze user activity and resources on a per-user basis, accurately forecast beneficial suggestions or recommendations relevant to the user based on a larger dataset of numerous users, and automatically generate tailored recommendations for specific users. Recommendations or advice may also be generated in response to an explicit question received from one or more users in real-time.

In further embodiments, the machine learning engine 261 may have a large dataset of user account information, resource transaction information, account resource amount information, account access information, user authorization information, situational data, or the like, from which to draw from and discern specific patterns or correlations related to account security, system security, or the like. For instance, the machine learning engine 261 may be trained on a large dataset of confirmed malfeasant transactions or transaction attempts in order to identity relevant patterns and characteristics associated with certain users, communication channels, transactions themselves (e.g., frequency, resource amount, certain resource accounts, entities, or the like), which may be correlated with a probability of potential resource loss. In these situations, responsive measures taken to further investigate transactions or communications with a high degree of probability for malfeasance may be key in reducing potential resource loss. As such, it is imperative that the machine learning engine 261 operate in an accurate and predictable manner, and the model must have the capability to dynamically adapt over time in response to changing data characteristics. However, if one feature set of the incoming data stream is skewing the output of the machine learning engine 261, it is necessary for the system to discern if the skew is natural or otherwise perhaps an intentionally levied method against the system in order to train the model to react to patterns or characteristics in a certain way. This is where the analysis of metadata in conjunction with machine learning output in order to identify feature sets which have the highest degree of impact on machine learning output over time may be most crucial.

The machine learning engine 261 may receive data from a plurality of sources and, using one or more machine learning algorithms, may generate one or more machine learning datasets 262. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. It is understood that additional or alternative machine learning algorithms may be used without departing from the invention.

The communication device 244 may generally include a modem, server, transceiver, and/or other devices for communicating with other devices on the network 101. The communication device 244 may be a communication interface having one or more communication devices configured to communicate with one or more other devices on the network 101, such as the model feedback system 200, the user device 104, other processing systems, data systems, etc. Additionally, the processing device 242 may generally refer to a device or combination of devices having circuitry used for implementing the communication and/or logic functions of the model feedback system 200. For example, the processing device 242 may include a control unit, a digital signal processor device, a microprocessor device, and various analog-to-digital converters, digital-to-analog converters, and other support circuits and/or combinations of the foregoing. Control and signal processing functions of the model feedback system 200 may be allocated between these processing devices according to their respective capabilities. The processing device 242 may further include functionality to operate one or more software programs based on computer-executable program code 252 thereof, which may be stored in a memory device 250, such as the processing system application 254 and the pattern recognition module 253. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 242 may be configured to use the network communication interface of the communication device 244 to transmit and/or receive data and/or commands to and/or from the other devices/systems connected to the network 101.

The memory device 250 within the model feedback system 200 may generally refer to a device or combination of devices that store one or more forms of computer-readable media for storing data and/or computer-executable program code/instructions. For example, the memory device 250 may include any computer memory that provides an actual or virtual space to temporarily or permanently store data and/or commands provided to the processing device 242 when it carries out its functions described herein.

FIG. 3 is a block diagram illustrating a user device associated with the model feedback system, in accordance with one embodiment of the present disclosure. The user device 104 may include a user mobile device, desktop computer, laptop computer, or the like. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, laptop computers, cameras, video recorders, audio/video player, radio, GPS devices, any combination of the aforementioned devices. The user device 104 may generally include a processing device or processor 310 communicably coupled to devices such as, a memory device 350, user output devices 340 (for example, a user display or a speaker), user input devices 330 (such as a microphone, keypad, touchpad, touch screen, and the like), a communication device or network interface device 360, a positioning system device 320, such as a geo-positioning system device like a GPS device, an accelerometer, and the like, one or more chips, and the like.

The processor 310 may include functionality to operate one or more software programs or applications, which may be stored in the memory device 350. For example, the processor 310 may be capable of operating applications such as a user application 351, an entity application 352, or a web browser application. The user application 351 or the entity application may then allow the user device 104 to transmit and receive data and instructions to or from the third party system 400, model feedback system 200, and the managing entity system 500, and display received information via the user interface of the user device 104. The user application 351 may further allow the user device 104 to transmit and receive data to or from the managing entity system 500 data and instructions to or from the model feedback system 200, web content, such as, for example, location-based content and/or other web page content, according to a Wireless Application Protocol (WAP), Hypertext Transfer Protocol (HTTP), and/or the like. The user application 351 may allow the managing entity system 500 to present the user 102 with a plurality of recommendations, identified trends, suggestions, transaction data, pattern data, graph data, statistics, and/or the like for the user to review. In some embodiments, the user interface displayed via the user application 351 or entity application 352 may be entity specific. For instance, while the model feedback system 200 may be accessed by multiple different entities, it may be configured to present information according to the preferences or overall common themes or branding of each entity system of third party system. In this way, each system accessing the model feedback system 200 may use a unique aesthetic for the entity application 352 or user application 351 portal.

The processor 310 may be configured to use the communication device 360 to communicate with one or more devices on a network 101 such as, but not limited to the third party system 400, the model feedback system 200, and the managing entity system 500. In this regard the processor 310 may be configured to provide signals to and receive signals from the communication device 360. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols and/or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance Bluetooth® low energy, audio frequency, ultrasound frequency, or other communication/data networks.

The communication device 360 may also include a user activity interface presented in user output devices 340 in order to allow a user 102 to execute some or all of the processes described herein. The application interface may have the ability to connect to and communicate with an external data storage on a separate system within the network 101. The user output devices 340 may include a display (e.g., a liquid crystal display (LCD) or the like) and a speaker or other audio device, which are operatively coupled to the processor 310 and allow the user device to output generated audio received from the model feedback system 200. The user input devices 330, which may allow the user device 104 to receive data from the user 102, may include any of a number of devices allowing the user device 104 to receive data from a user 102, such as a keypad, keyboard, touch-screen, touchpad, microphone, mouse, joystick, other pointer device, button, soft key, and/or other input device(s).

The user device 104 may also include a memory buffer, cache memory or temporary memory device 350 operatively coupled to the processor 310. Typically, one or more applications 351 and 352, are loaded into the temporarily memory during use. As used herein, memory may include any computer readable medium configured to store data, code, or other information. The memory device 350 may include volatile memory, such as volatile Random Access Memory (RAM) including a cache area for the temporary storage of data. The memory device 350 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the model feedback system 200 performing one or more steps described herein in conjunction with other devices and systems, either automatically based on executing computer readable instructions of the memory device 250, or in response to receiving control instructions from the managing entity system 500. In some instances, the system refers to the devices and systems on the operating environment 100 of FIG. 1. The features and functions of various embodiments of the invention are be described below in further detail.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 4 is a flow diagram illustrating a model feedback loop, in accordance with one embodiment of the present disclosure. As shown in block 410, the process begins wherein data is received by the model feedback system 200 and is fed to the data analysis module 260 for pre-processing and further analysis. It is understood that data may be received by the model feedback system 200 from any number of systems or entities, such as the managing entity system 500, one or more third party system(s) 400, user device(s) 104, or a datastore, such as database 300. In some embodiments, data is received by the model feedback system 200 in a continuous stream from one or more systems, devices, or entities (e.g., transaction data may be continuously received from the managing entity system 500 and processed continuously over time, or the like). In other embodiments, data may be received by the model feedback system 200 in batches, such as once per day, per week, or the like, and different output from the model feedback system 200 may be compared over time in order to discern differences in the resulting model output between these ongoing time periods.

As shown in block 420, the process proceeds whereby the model feedback system 200, or in some embodiments, the data analysis module 260 in particular, is tasked with analyzing the metadata of received data, and characterizing a component feature set of the received data. For instance, the model feedback system 200 may receive a data set for day 1, and the data set for day 1 may include transaction data at a specific entity location. The metadata of this data set may indicate various features of each transaction. For instance, a transaction 1 may include a transaction resource amount, time of transaction, transaction accounts (e.g., receiving and sending, or the like), one or more additional entities involved with processing the transaction, resource channel (e.g., payment rail, or the like), one or more user identities or account holders, products, services, or the like. Each of these features may be characterized as a separate column, or the like, in which to catalogue metadata associated with transaction 1, and the same or similar feature categorization and characterization may be done for the remaining data in the data set.

Furthermore, as shown in block 430, the data set may be forwarded to machine learning engine 261 for analysis of the data set. As noted, the machine learning engine 261 may comprise any number or variations of machine learning models designed and trained to identify certain characteristics, features, or relationships between features, patterns, relevant data points, or the like. Output from the model(s) of machine learning engine 261 are continuously monitored, as shown in block 440. Statistically significant shifts in the output from machine learning engine 261 over time may be recognized here by the model feedback system 200. In this way, once the model feedback system 200 has detected a significant shift in the output from machine learning engine 261, the system may return the data set to data analysis module 260 for further processing. The data analysis module 260 may detect features within the data set which are corelated with the rise in volatility in machine learning engine 261 output, and via comparison with previous data sets, or data processed at an earlier time which did not show this same volatility, and thus may automatically discern certain features which are responsible for the rise in output volatility. In some embodiments, the correlation between certain features and model output volatility may be partially or fully recognized based on how often the certain features change during a specific event or through a specific period of time.

Based on the severity of the shift in the machine learning engine 261 output, the system 200 may then apply a proportionate counteractive weighting against the identified volatile feature(s) within the data set, and within future data sets, prior to forwarding the data set to the machine learning engine 261 for analysis, thereby stabilizing the output of the machine learning engine 261. In this way, erratic or inaccurate output from the machine learning engine 261 may be accounted for and responded to in an automated, looped fashion, in order to reduce the chances of corrupting data being injected into the machine learning engine 261 and skewing its output in a potentially malfeasant manner.

Once the system 200 has identified the volatile features of the data set, the system 200 may apply a dampening effect on the volatile features specifically, effectively making this data or other older data less significant as time progresses. In this way, the system applies less weight to older data in general, but may do so via the dampening of certain volatile features in particular. In some embodiments, identification of data that will be affected by the identified volatility is just as valuable as knowing what has been affected in the machine learning engine 261 output already. As such, the system 200 may also identify weights in order to inform on what data may be affected in the future, thereby proactively avoiding volatility in model output if similar significant shifts in model output or data input begin to arise, or if similar events occur as the events that were correlated with the previously identified volatility.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for improved integrity of machine learning model input data, the system comprising:

at least one non-transitory storage device; and at least one processing device coupled to the at least one non-transitory storage device, wherein the at least one processing device is configured to:

train a machine learning model using a training dataset to detect patterns associated with one or more users and communication channels, wherein the training dataset comprises malfeasant data correlated with a resource loss threshold associated with the one or more users;

receive one or more data sets for machine learning model analysis that are distinct from the training dataset, wherein the one or more data sets comprise machine learning output, resource transaction information, and device data;

parse the one or more data sets and identify one or more features based on meta data of the one or more data sets, wherein the meta data comprises an encryption type and an elapsed creation time;

transmit the one or more data sets to the machine learning model trained on the training dataset that comprises the malfeasant data, wherein the machine learning model comprises an artificial neural network algorithm;

continuously monitor, via a model feedback system, machine learning model analysis output for the one or more data sets;

identify, via the model feedback system and by comparing output of the machine learning model for current data sets with output generated from prior data sets processed at an earlier time, a shift in the machine learning model analysis output of the one or more data sets, wherein the shift comprises corrupted data skewing the machine learning output;

correlate features of the one or more data sets with the identified shift in the machine learning model analysis output to identify one or more volatile features in the one or more data sets, wherein the one or more volatile features correspond to data entries that exist in the one or more data sets and change during a specified time period;

apply, via an automated loop, a weighting to the one or more volatile features in the one or more data sets to offset the shift in the machine learning model analysis output, wherein the weighting further comprises a dampening variable effect of the one or more volatile features on the machine learning model analysis output;

identify forecast weights to forecast data impacts based on at least one of the one or more data sets and one or more volatile features; and generate prophylactic actions comprising additional weighting of data sets to be taken on one or more users and communication channels based on sources, time since creation, and encryption associated with the one or more data sets.

2. The system of claim 1, wherein the one or more data sets further comprises a continuous stream of data.

3. The system of claim 1, wherein the machine learning model further comprises a predictive machine learning model or pattern recognition machine learning model.

4. The system of claim 1, wherein the weighting is applied dynamically to lessen effect of older data on the machine learning model analysis output over time.

5. The system of claim 1, further configured to generate a prediction based on the one or more volatile features, wherein the prediction comprises an expected effect of the one or more volatile features on future machine learning model analysis output.

6. A computer program product for secured integrity of machine learning model input data, the computer program product comprising at least one non-transitory computer-readable medium having computer-readable program code portions embodied therein, the computer-readable program code portions comprising:

an executable portion configured to train a machine learning model using a training dataset to detect patterns associated with one or more users and communication channels, wherein the training dataset comprises malfeasant data correlated with a resource loss threshold associated with the one or more users;

an executable portion configured to receive one or more data sets for machine learning model analysis that are distinct from the training dataset, wherein the one or more data sets comprise machine learning output, resource transaction information, and device data;

an executable portion configured to parse the one or more data sets and identify one or more features based on meta data of the one or more data sets, wherein the meta data comprises an encryption type and an elapsed creation time;

an executable portion configured to transmit the one or more data sets to the machine learning model trained on the training dataset that comprises the malfeasant data, wherein the machine learning model comprises an artificial neural network algorithm;

an executable portion configured to continuously monitor, via a model feedback system, machine learning model analysis output for the one or more data sets;

an executable portion configured to identify, via the model feedback system and by comparing output of the machine learning model for current data sets with output generated from prior data sets processed at an earlier time, a shift in the machine learning model analysis output of the one or more data sets, wherein the shift comprises corrupted data skewing the machine learning output;

an executable portion configured to correlate features of the one or more data sets with the identified shift in the machine learning model analysis output to identify one or more volatile features in the one or more data sets, wherein the one or more volatile features correspond to data entries that exist in the one or more data sets and change during a specified time period;

an executable portion configured to apply, via an automated loop, a weighting to the one or more volatile features in the one or more data sets to offset the shift in the machine learning model analysis output, wherein the weighting further comprises a dampening variable lessening effect of the one or more volatile features on the machine learning model analysis output;

identify forecast weights to forecast data impacts based on at least one of the one or more data sets and one or more volatile features; and generate prophylactic actions comprising weighting of data sets to be taken on one or more users and communication channels based on sources, time since creation, and encryption associated with the one or more data sets.

7. The computer program product of claim 6, wherein the one or more data sets further comprises a continuous stream of data.

8. The computer program product of claim 6, wherein the machine learning model further comprises a predictive machine learning model or pattern recognition machine learning model.

9. The computer program product of claim 6, wherein the weighting is applied dynamically to lessen effect of older data on the machine learning model analysis output over time.

10. The computer program product of claim 6, further configured to generate a prediction based on the one or more volatile features, wherein the prediction comprises an expected effect of the one or more volatile features on future machine learning model analysis output.

11. A computer-implemented method for secured integrity of machine learning model input data, the method comprising:

training a machine learning model using a training dataset to detect patterns associated with one or more users and communication channels, wherein the training dataset comprises malfeasant data correlated with a resource loss threshold associated with the one or more users;

receiving one or more data sets for machine learning model analysis that are distinct from the training dataset, wherein the one or more data sets comprise machine learning output, resource transaction information, and device data;

parsing the one or more data sets and identify one or more features based on meta data of the one or more data sets, wherein the meta data comprises an encryption type and an elapsed creation time;

transmitting the one or more data sets to the machine learning model trained on the training dataset that comprises the malfeasant data, wherein the machine learning model comprises an artificial neural network algorithm;

continuously monitoring, via a model feedback system, machine learning model analysis output for the one or more data sets;

identifying, via the model feedback system and by comparing output of the machine learning model for current data sets with output generated from prior data sets processed at an earlier time, a shift in the machine learning model analysis output of the one or more data sets, wherein the shift comprises corrupted data skewing the machine learning output;

correlating features of the one or more data sets with the identified shift in the machine learning model analysis output to identify one or more volatile features in the one or more data sets, wherein the one or more volatile features correspond to data entries that exist in the one or more data sets and change during a specified time period;

applying, via an automated loop, a weighting to the one or more volatile features in the one or more data sets to offset the shift in the machine learning model analysis output, wherein the weighting further comprises a dampening variable lessening effect of the one or more volatile features on the machine learning model analysis output;

identifying forecast weights to forecast data impacts based on at least one of the one or more data sets and one or more volatile features;

generating prophylactic actions comprising additional weighting of the data sets to be taken on ore or more users and communication channels based on sources, time since creation, and encryption associated with the one or more data sets.

12. The computer-implemented method of claim 11, wherein the one or more data sets further comprises a continuous stream of data.

13. The computer-implemented method of claim 11, wherein the machine learning model further comprises a predictive machine learning model or pattern recognition machine learning model.

14. The computer-implemented method of claim 11, wherein the weighting is applied dynamically to lessen effect of older data on the machine learning model analysis output over time.

\* \* \* \* \*